United States Patent [19]

Tipton

[11] Patent Number: 4,732,251

[45] Date of Patent: Mar. 22, 1988

[54] MOTORCYCLE ADJUSTABLE SLIDER CLUTCH

[76] Inventor: Kenneth L. Tipton, 1031 Fairlawn Dr., Rockledge, Fla. 32955

[21] Appl. No.: 909,574

[22] Filed: Sep. 22, 1986

[51] Int. Cl.$^4$ .................. F16D 43/10; F16D 13/75
[52] U.S. Cl. .................. 192/70.24; 192/70.26; 192/70.3; 192/93 A; 192/105 C; 192/111 B
[58] Field of Search .............. 192/70.23, 70.24, 70.25, 192/70.26, 70.3, 89 W, 93 A, 103 A, 105 C, 110 R, 111 R, 111 B; 180/230

[56] References Cited

U.S. PATENT DOCUMENTS

| 1,035,535 | 8/1912 | Coleman | 192/105 C |
| 1,743,170 | 1/1930 | Vail | 192/105 C |
| 4,111,291 | 9/1978 | Horstman | 192/105 C |
| 4,566,577 | 1/1986 | Tsuboi | 192/96 |

FOREIGN PATENT DOCUMENTS 135952 10/1979 Japan .................. 192/103 A
52629 5/1981 Japan .................. 192/93 A Primary Examiner—Rodney H. Bonck
Assistant Examiner—David A. Testardi
Attorney, Agent, or Firm—Gordon K. Anderson

[57] ABSTRACT

A motorcycle slider clutch utilizing several original equipment manufacturers components, such as the output shaft (20) with gear cluster (24) and bearing (26), the center hub (30) and friction disks with plates (32) attached to a slider basket (34) and a resiliently mounted gear assembly (44). This combination contains the above described components along with a slider plate assembly (64) having an inside pressure plate (74) spring loadedly attached. The inside plate (74) further contains a group of fingers (82) that force the plate into contact with the disks and plates (32) making a union between the rotating elements due to the centrifugal force applied by the fingers (82). The apparatus employs the use of existing oil lubricated standard clutch components heretofore impractical.

6 Claims, 5 Drawing Figures

MOTORCYCLE ADJUSTABLE SLIDER CLUTCH

TECHNICAL FIELD

The present invention relates to centrifugal clutches for motorcycles in general, and more specifically to slider clutches that operate in racing environments.

BACKGROUND ART

In the art of drag, or so called street, racing of motorcycles the reaction time for leaving the starting line beginning from a stationary position is extremely critical. Conventional clutches that are normally utilized in motorcycles are operated manually by a lever mounted on the handlebar. The coordination of increasing speed with the accelerator and releasing the clutch at the proper engine speed has proven to be ineffective and erratic. The most optimum speed of the engine when engagement occurs depends upon many factors, such as the size or displacement of the engine, weight of the motorcycle and driver as a combination, track conditions, and many other constituents. Manual operation does not allow consistency in this critical value, therefore, the top racing faction has locked toward a centrifugal clutch allowing a mechanical predetermined set point to be utilized for engagement of the clutch. The prior art in this field has applied a clutch that uses a dry plate of a type of material with a high coefficient of friction against metal inner plates. While the clutch inherently operates satisfactorily, considerable modification to the structure is required. Since the conventional clutches in modern motorcycles employ an oil lubricated system including the clutch plates, the application of a dry type clutch necessitates closing off part of the crankcase housing that contains the clutch and installing the entire assembly on the outside with an oil seal inbetween. Further, as the entire clutch is external, there is no support for the rear bearing and the shaft is then cantilevered outward reducing the strength, balance, and life of the bearings. This modification is also very expensive, as the main structure of the motorcycle is affected and all new components are required to replace the existing factory designed clutch. The known advantage of a centrifugal clutch to gain superiority in regulated speed engagement and slip control is almost universally accepted in the art.

DISCLOSURE OF THE INVENTION

As almost all clutches previously utilized of the centrifugal type have looked toward the dry friction plate as the prime element thus necessitating extensive modification, it is the primary object of the invention to utilize a clutch that is completely inside the motorcycle case and requires no modification to the structure or basic changes to the lubrication system. This is accomplished by the use of the same friction clutch plates and metal interceding plates, as furnished in the original manufacture of the vehicle, also the same output shaft with its corresponding driver gear cluster. The invention, by using the same clutch plates, fits within the existing package and is completely balanced as it runs between a pair of lubricated bearings. Replacement of the cover is necessary in order to allow sufficient room for actuation, however, this requires no actual modification to the gear case, only replacement of a component.

An important object of the invention is directed to the lubrication system of the motorcycle which again requires no basic modification. The oil pump has sufficient capacity to supply the necessary lubricating oil to the clutch and bearings through the present galleries and sump, and as the friction plates are already designed for the actual environment.

Another object of the invention allows complete adjustment of engagement over a large range of engine speeds. The clutch may be easily adjusted from 1500 revolutions per minute (RPM) to 9000 (RPM), considering the fact that most two cycle motorcycle engines operate to approximately 14,000 (RPM). This adjustment is well within the optimum speed allowing the peak torque to be utilized.

Still another object of the invention provides an adjustable slip factor that may be preselected and easily accomplished by the simple rotation of the screws holding the compression springs in place. This slip factor may be predetermined by a computer taking into account the variables of vehicle weight, driver weight, type of tires, and other conditions. The actual adjustment is made with precision instruments that accurately measure distance allowing this regulation to be consistent and repeatable. Curves may be made in advance dealing with the variables allowing this adjustment to be made under actual track conditions at the time of use. The procedure for preloading the springs is simple and may be accomplished by removing the cover exposing the clutch and inserting a tool into the screws holding the springs into place.

BEST MODE FOR CARRYING OUT THE INVENTION

Figure 1:
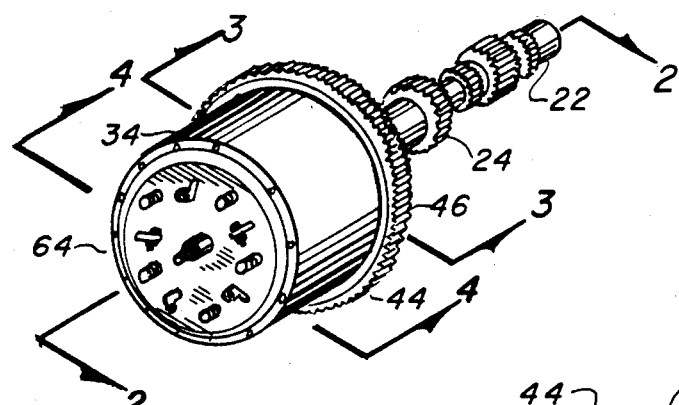
FIG. 1 is a partial isometric view of the preferred embodiment shown completely assembled, less housing cover and bearing, including the shaft and gears that have been removed from the motorcycle and assembled into the invention.
Figure 3:
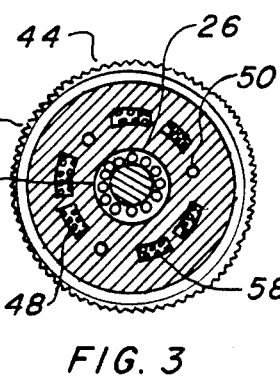
FIG. 3 a cross-sectional view taken along lines 3—3 of FIG. 1.
Figure 2:
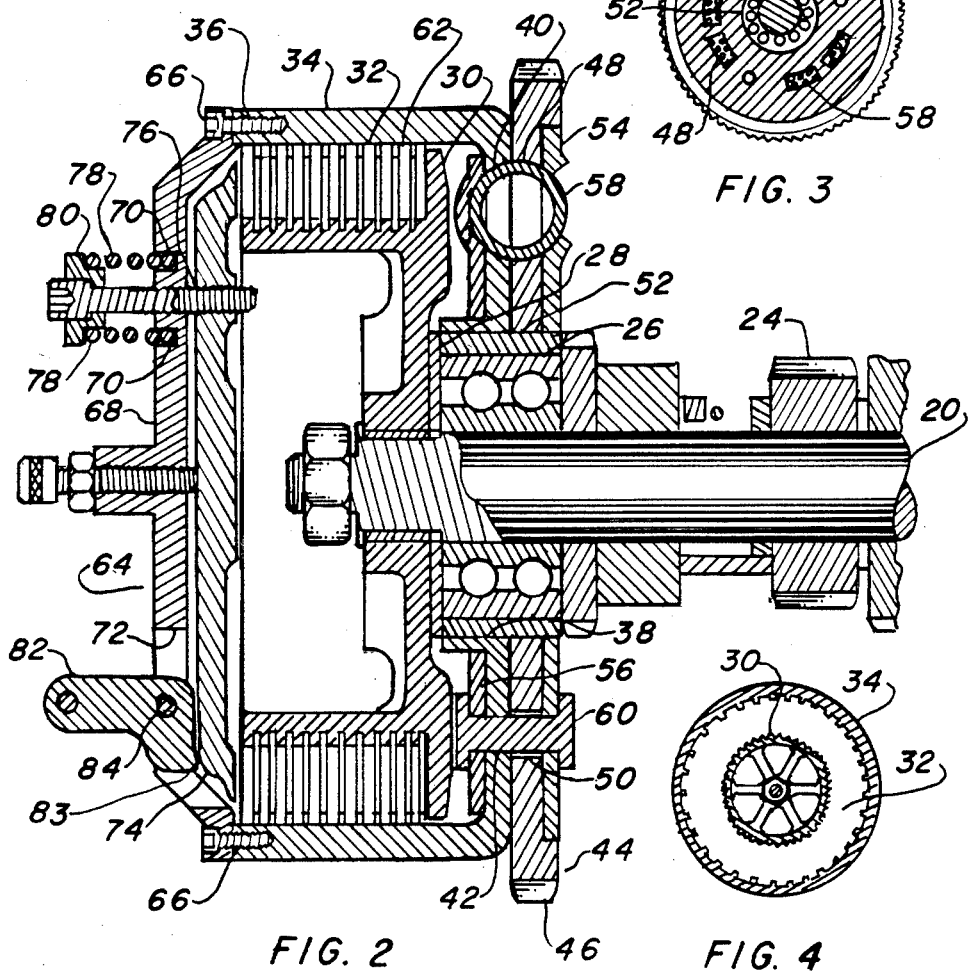
FIG. 2 is a cross-sectional view taken along lines 2—2 of FIG. 1 shown in the static position.
Figure 4:
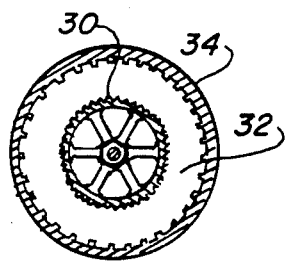
FIG. 4 is a cross-sectional view taken along lines 4—4 of FI 1.
Figure 5:
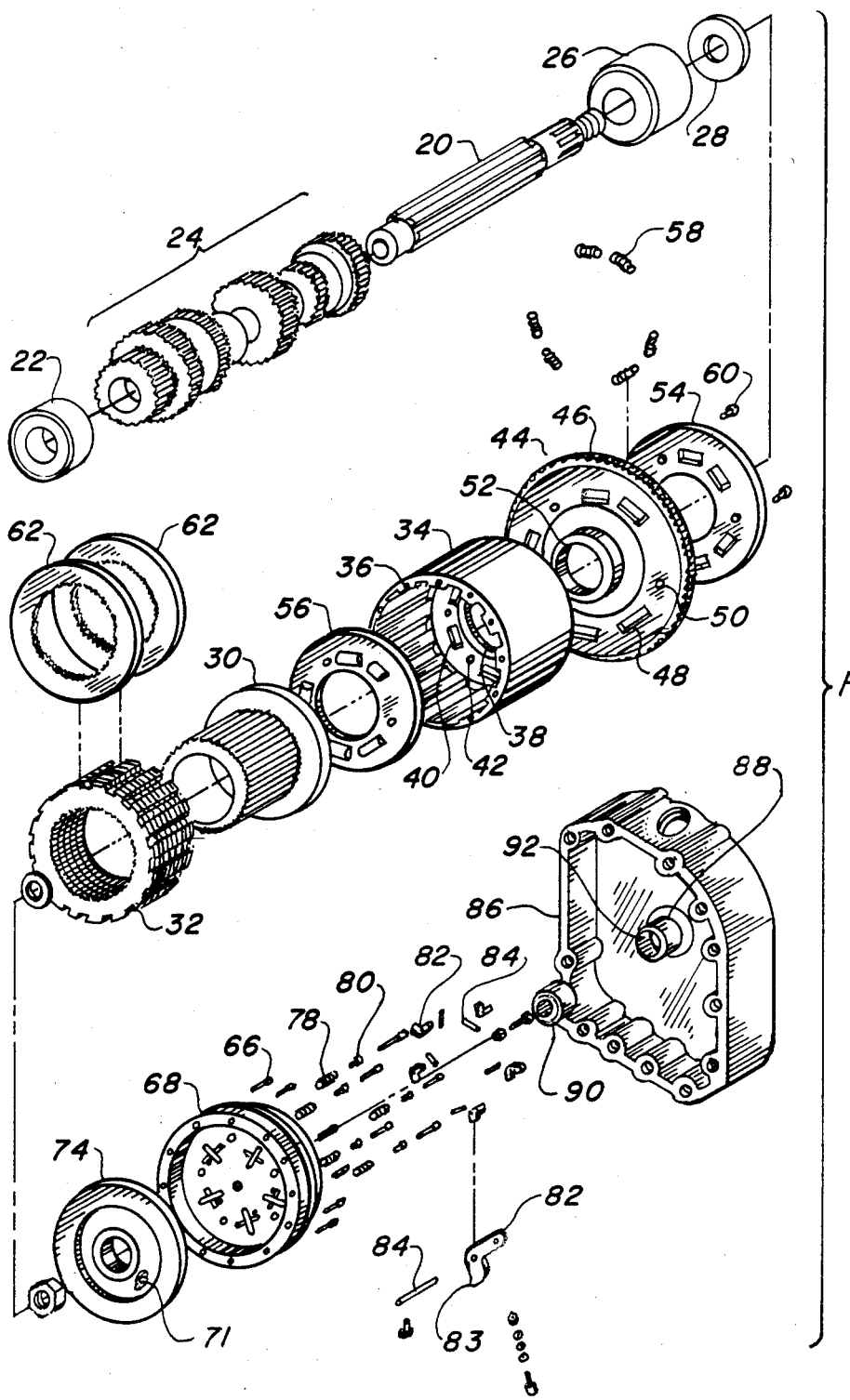
FIG. 5 is an exploded view of the slider clutch with the elements utilized from the original equipment manufacturer shown in light lines without shading.

The best mode for carrying out the invention is presented in terms of a preferred embodiment. The preferred embodiment, as shown in FIGS. 1 through 6 is comprised of the following components utilized by the original equipment manufacture on the same motorcycle the clutch is intended for. These include a transmission output shaft 20, including a front bearing 22, the entire transmission gear cluster 24 with all necessary gears, jaws, bearings and springs, the main bearing assembly 26 including the thrust washer 28, the center hub and a plurality of alternately nested clutch friction disks and clutch pressure plates 32. These components are illustrated best in the exploded view, FIG. 5, and are shown with light lines for differentiation with the new elements.

The new elements that make-up the invention are comprised of a slider basket 34 that is in cylindrical shape with one end open and the other end closed. The outside of the cylinder is smooth with the inside containing a plurality of grooves that are the same approximate size as the peripheral teeth on the friction disks 32. The open end contains a number of attaching holes 36. The closed end contains a centrally located bearing opening 38 and a series of spring slots 40 and rivet holes 42.

A spring loaded housing gear assembly 44 is resiliently attached to the slider basket 34 flexibly transferring the torque from the gear to the basket. This gear assembly 44 contains a housing gear 46 that includes a ring gear on the periphery and a series of spring retaining slots 48 and clearance holes 50 with a bearing receiving opening 52 in the center of the web. An outside backing plate 54, having a plurality of spring retaining radially formed apertures upset from the plate placed on one side of the gear 46 and the basket 34 on the other. An inside backing plate 56 having matching spring cavities and rivet holes is positioned directly inside the basket 34 closed end. A plurality of springs 58 are captivated within the slots 40 and 48 in the basket 34 and gear 46, also, the upset apertures of the outside backing plate 54 and the cavities of the inside backing plate 56. A plurality of rivets 60 penetrate through the mating holes 42 and 50, including those in the backing plates 54 and 56, and join the four elements together with a permanent head on one end of the rivet and a bucked head on the other. This assembly of parts allows movement therebetween defining a torque and shock absorbing association.

The main bearing assembly 26 is installed in the bearing opening 38 of the slider basket 34 that formed a rotational bearing receptacle and the shaft 20 is slid into the inner race of the bearing 26. The front bearing 22 and transmission gear cluster 24 are on one end and the center hub 30 is mounted with a hex nut and washer on the other, with the slider basket 34 and housing gear assembly 44 inbetween. The motorcycle clutch friction disks and clutch pressure plates 32 are inserted between the basket 34 and the center hub 30. The outwardly extending teeth of the friction disks 32 mate with the inside grooves in the basket 34 and the center hub 30 contains similar grooves, but on the outside diameter that mates with extending teeth on the clutch pressure plates 32. The disks and plates 32 are stacked together filling the void between the inside pressure plate 74 and the end of the center hub 30 allowing free rotation therebetween.

The stack of disks and plates 32, as furnished by the original equipment manufacturer, are deemed acceptable to use in many applications and types of motorcycle racing. However, in some instances two or three fused hard chrome pressure plates 62 are added between intervening nest to remove excessive heat from the contiguous surfaces allowing a balanced frictional load within the stack.

An outside slider plate assembly 64 is fastened to the open end of the slider basket 34 using capscrews 66 threaded into the attaching holes 36. This assembly 64 contains an outside slider plate 68 having a plurality of spring recesses 70 with clearance holes in the center and finger receiving and retaining slots 72. Further, an adjustably connected spring loaded inside pressure plate 74 is attached compressibly to the outside plate 68 by the use of threaded fastening screws 76 that are positioned through the holes in the spring recesses 70, and are connected to a plurality of threaded retaining holes 71 in the inside plate 74. The screws are compressible in that they fasten rigidly to the inside pressure plate 74 on one end and to a compression spring 78 and bushing 80 on the other. This is accomplished with one end of the spring held within the recesses 70, and the other having a bushing 80 captivated within. This bushing 80 is the same outside diameter as the inside of the spring 78 with a flange on the outer end and a screw retaining cavity inside slightly larger than the head of the threaded fastening screw 76. This combination captivates the spring 78 and allows the inside pressure plate 74 to move away from the slider plate 68 under spring tension separating them under controlled force.

The outside slider plate 68 further contains a number of offset fingers 82 that are rotatably mounted into the finger receiving and retaining slots 72. These fingers 82 are flat in an "L" shape with a cam shaped spatial extension 83 on the bottom outside end of the leg, and further contain a hole in the opposed long end and one at the angular intersection. The first hole allows a weight to be added, preferably in the form of a screw, nut and plurality of washers, shown in FIG. 5, with the second hole allowing a pin 84 to penetrate within and become the fulcrum point. The pin 84 attached to the finger 82 is positioned within the slots 72 rotatably captivating them within with a head of a screw locking the pin into place completing the restraint. The fingers 82 are free to rotate on the pins 84, and when the housing gear assembly 44 is rotated by the motorcycle engine, centrifugal force places the end opposite the counterweights in contact with the inside pressure plate 74. The cam surface 83 or spatial extension of the finger 82 is configured in such a manner as to allow the bottom face of the finger to come in contact with the plate 74 at the lower speeds of the engine perhaps 1000 RPM below the leaving speed, which is approximately 5000 RPM for a 2 stroke engine. When the rotation of the clutch reaches the leaving speed, the cam surface 83 applies additional leverage beyond the normal linear function to assure immediate clutch engagement and apply maximum instantaneous pressure.

A clutch housing cover 86 is incorporated into the apparatus. This cover 86 is the same shape as the motorcycle clutch casing, except it contains a bearing recess 88 and is, therefore, slightly deeper. A ball bearing 90 is pressed into the recess 88 and when assembled, mates with a bearing hub 92 that is integral with the clutch housing cover 86.

In operation the motorcycle engine drives the gear 46 on the housing assembly 44 rotating the attached slider basket 34 and accompanying components. The offset fingers 82 apply pressure to the inside pressure plate 74 working against the resistance of the compression springs 78. This linear movement is due to centrifugal force and inward camming effect applied by the weight and spatial extended configuration of the fingers 82. This force causes the inside pressure plate 74 to contact the nested clutch friction disks and clutch pressure plate 32 at the exact engagement speed of the engine which is at the peak of the torque and horsepower curve, causing them to compress together and unitedly join the slider basket 34 and its contiguous elements with the center hub 30 and the output shaft 20 containing the gear cluster 24. This union between all of the movable parts causes the gears to engage propelling the motorcycle. The adjustment of the spring loaded screws 78 in the slider plate assembly 64 provide a predetermined speed engagement and the weights on the fingers 82 may be altered to adjust the slip factor.

The apparatus illustrated and described as the preferred embodiment is based on the components for a motorcycle produced by Suzuki in Japan. Other motorcycles are also well adapted for use with this slider clutch, however, slight differences occur to accommodate the actual component configuration.

While the invention has been described in complete detail and pictorially shown in the accompanying drawings, it is not to be limited to such details, since many changes and modifications may be in the embodiment without departing from the spirit and the scope thereof. Hence, it is described to cover any and all motorcycles with necessary modifications and design forms which may come within the language and scope of the appended claims.

I claim:

1. A motorcycle adjustable slider clutch utilizing the original equipment manufacturers transmission output shaft, front bearing, transmission gear cluster, main bearing assembly, center hub and plurality of alternately nested clutch friction disks and clutch pressure plates comprising:
    (a) a slider basket member having a cylindrical body with an open end and a closed end;
    (b) a spring loaded housing gear assembly resiliently attached to the closed end of said slider basket in such a way as to transmit torque from the housing gear assembly to the basket in a flexible manner;
    (c) said main bearing assembly slippingly joined into said spring loaded housing gear assembly which forms a rotational bearing receptacle;
    (d) said transmission output shaft being received with said main bearing assembly and having said front bearing and transmission gear cluster on one end and said center hub and plurality of alternately nested clutch friction disks and clutch pressure plates on the other, said friction disks engaging said slider basket and said pressure plates engaging said center hub; and,
    (e) an outside slider plate assembly attached to the open end of the basket having an adjustable connected spring loaded inside pressure plate and a plurality of rotatable offset fingers extending therethrough, each having a cam shaped spatial extension urgingly forcing the inside pressure plate into contact with said nested clutch friction disks and clutch pressure plates by the inward camming of the fingers induced by rotational centrifugal force causing the clutch disks and plates to compress together unitedly joining the slider basket clutch friction disks and pressure plates with the center hub making a union between the housing gear assembly and the transmission gear cluster at an adjustable predetermined speed of the housing gear assembly.

2. The motorcycle adjustable slider clutch as recited in claim 1 further comprising: said slider basket member having a cylindrical shape with a smooth outside diameter and a plurality of grooves on the inside diameter also having a plurality of outside slider plate attaching holes on the open end and having a centrally located bearing opening and a plurality of spring slots and rivet holes on the closed end for connecting the housing gear to the closed end, and the outside slider plate assembly to the other.

3. The motorcycle adjustable slider clutch as recited in claim 1, the spring loaded housing gear assembly further comprising:
    (a) a housing gear forming a ring gear on its periphery having a plurality of spring retaining slots and clearance holes and a bearing receiving opening in a web portion thereof;
    (b) an outside backing plate haivng a plurality of spring retaining radially formed apertures upset from the plate and rivet holes;
    (c) a inside backing plate having spring cavities and rivet holes positioned directly adjacent to said slider basket closed end;
    (d) a plurality of springs captivated within all of the following: apertures in the slider basket, said housing gear spring retaining slots, said outside backing plate spring retaining upset apertures and said inside backing plate spring cavities and positioned in such a manner as to provide movement between the slider basket and the housing gear assembly; and,
    (e) a plurality of rivets penetrating through said rivet holes and said clearance holes having a formed head on one end and a set head on the other creating an assembly which is resilient in nature, therefore, allowing torque shock absorption.

4. The motorcycle adjustable slider clutch as recited in claim 1 further comprising:
    (a) said outside slider plate assembly having an outside slider plate with spring recesses with clearance holes in the center thereof, also a plurality of finger receiving and retaining slots;
    (b) a plurality of compression springs positioned within said spring recesses;
    (c) a plurality of spring bushings nested within said springs having a screw retaining cavity therein;
    (d) said inside pressure plate further having a plurality of threaded retaining holes;
    (e) a plurality of screws attaching said bushings within said springs to said inside pressure plate through the clearance hole in the outside plate and into the threaded retaining holes within the inside pressure plate allowing the plates to be spaced one from the other with spring pressure; and,
    (f) said offset fingers rotatable mounted into said finger receiving and retaining slots in the outside slider plate forcing the inside pressure plate away from the outside slider plate by the camming action of the offset fingers induced by centrifugal force when rotated.

5. The motorcycle adjustable slider clutch as recited in claim 1 further comprising: a plurality of heat resisting fused hard chrome pressure plates intervening said nested clutch friction disks and clutch pressure plates such that excessive heat is removed from the surfaces of the plates allowing a balanced frictional load thereupon.

6. The motorcycle adjustable slider clutch as recited in claim 1 further comprising: a clutch housing cover enclosing said clutch and having a shaft bearing mounted within said housing cover, said housing cover being attached to said motorcycle engine block with said output shaft installed in the shaft bearing from shaft support.

* * * * *